United States Patent [19]

Frick

[11] Patent Number: 4,866,435

[45] Date of Patent: Sep. 12, 1989

[54] DIGITAL TRANSMITTER WITH VARIABLE RESOLUTION AS A FUNCTION OF SPEED

[75] Inventor: Roger L. Frick, Chanhassen, Minn.

[73] Assignee: Rosemount Inc., Eden Prairie, Minn.

[21] Appl. No.: 109,490

[22] Filed: Oct. 16, 1987

[51] Int. Cl.[4] .............. H04Q 9/02

[52] U.S. Cl. .............. 340/870.16; 340/870.01; 340/870.39; 364/724.05

[58] Field of Search .............. 340/870.07, 870.16, 340/870.21, 870.43, 870.37, 870.01, 870.39; 375/96; 364/724.01, 724.05; 341/157; 307/261, 262, 263, 271, 519; 328/127

[56] References Cited

U.S. PATENT DOCUMENTS 3,646,538 2/1972 Frick .............. 340/870.37

4,087,796 5/1978 Brown .............. 340/870.21

4,623,800 11/1986 Price .............. 307/261

*Primary Examiner*—Donald J. Yusko

*Assistant Examiner*—Tyrone Queen

*Attorney, Agent, or Firm*—Kinney & Lange

[57] ABSTRACT

A digital transmitter with an analog sensor uses an integrating analog-to-digital (A/D) converter to digitize the analog signal from the sensor. The A/D converter produces a digital output which is a continuous, nonrezeroed integrated average of the analog signal, so that the integrated average of the digital output over time does not contain inherent quantization errors. A microcomputer system digitally filters the signal from the A/D converter, and then uses the digitally filtered signal to produce the transmitter output signal. By varying the response time of the digital filter, the response time and resolution of the transmitter can be varied.

9 Claims, 3 Drawing Sheets

DIGITAL TRANSMITTER WITH VARIABLE RESOLUTION AS A FUNCTION OF SPEED

BACKGROUND OF THE INVENTION

1. Field of the Invention.

The present invention relates to transmitters which produce an output as a function of a sensed parameter.

2. Description of the Prior Art.

Transmitters which sense a parameter and produce an output representing the sensed parameter have found widespread use in industrial process control systems. While most transmitters originally made use of analog electrical circuits, the development of low cost and low power digital electronics (and particularly microcomputer systems) has made it attractive to consider digital transmitters which perform at least some of the transmitter functions using digital circuitry.

Despite the increased attention given to digital transmitters, most sensors used for sensing common process control parameters (such as pressure and temperature) generate analog rather than digital sensor outputs. Digital transmitters which make use of analog sensor outputs need an analog-to-digital (A/D) converter to digitize the analog information. Because of power constraints, it is usually necessary to make trade-offs between output speed and output resolution in the circuit design of a digital transmitter. Typically these trade-offs will not satisfy all users, because some applications require fast response, while others require high resolution.

SUMMARY OF THE INVENTION

The present invention relates to a digital transmitter which uses an analog sensor and which offers the ability to adjust speed (or response time) as a function of resolution without requiring a reconfiguration or change to the A/D converter hardware.

The present invention is based upon the recognition that, in certain types of A/D converters, an integrated average of the digital output over time tends toward (or is proportional to) an integrated average of the analog input over time without accumulating quantization errors. A quantization error is the difference between the analog input value and the digital output value for each quantization by the A/D converter. With these types of A/D converters, the longer the measurement time after a change of the analog input, the more resolution that is provided in the integrated digital output up to the point where measurement noise dominates over quantization errors. With these types of A/D converters, quantization errors which occur during a quantization tend to be counterbalanced by correction to subsequent quantizations.

With the present invention, the output of the integrating, quasi-continuous, non-rezeroed A/D converter is digitally filtered to produce a filtered digital signal. The output of the A/D converter is characterized as "quasi-continuous" since its output update time is shorter than a time constant of subsequent digital filtering. The output signal of the transmitter is provided as a function of this filtered digital signal.

The response time of the transmitter of the present invention is controlled by the response time constant of the digital filter. It is possible, therefore, to use an A/D converter which provides a relatively low resolution output at a relatively high speed, and to use adjustment of the response time of the digital filter to control the resolution.

Because the digital filter can, in preferred embodiments, be implemented as part of signal processing performed under software control by a microcomputer system, the present invention offers a very simple and easy way to vary resolution and speed of the transmitter. It is only necessary to change the filtering constants by reconfiguring the digital filtering software to vary the performance of the transmitter to suit the particular application. This reconfiguration of filtering constants can be accomplished by simply applying digital signals to the transmitter.

DETAILED DESCRIPTION OF THE PREFERRED EMBODIMENTS

Figure 1:
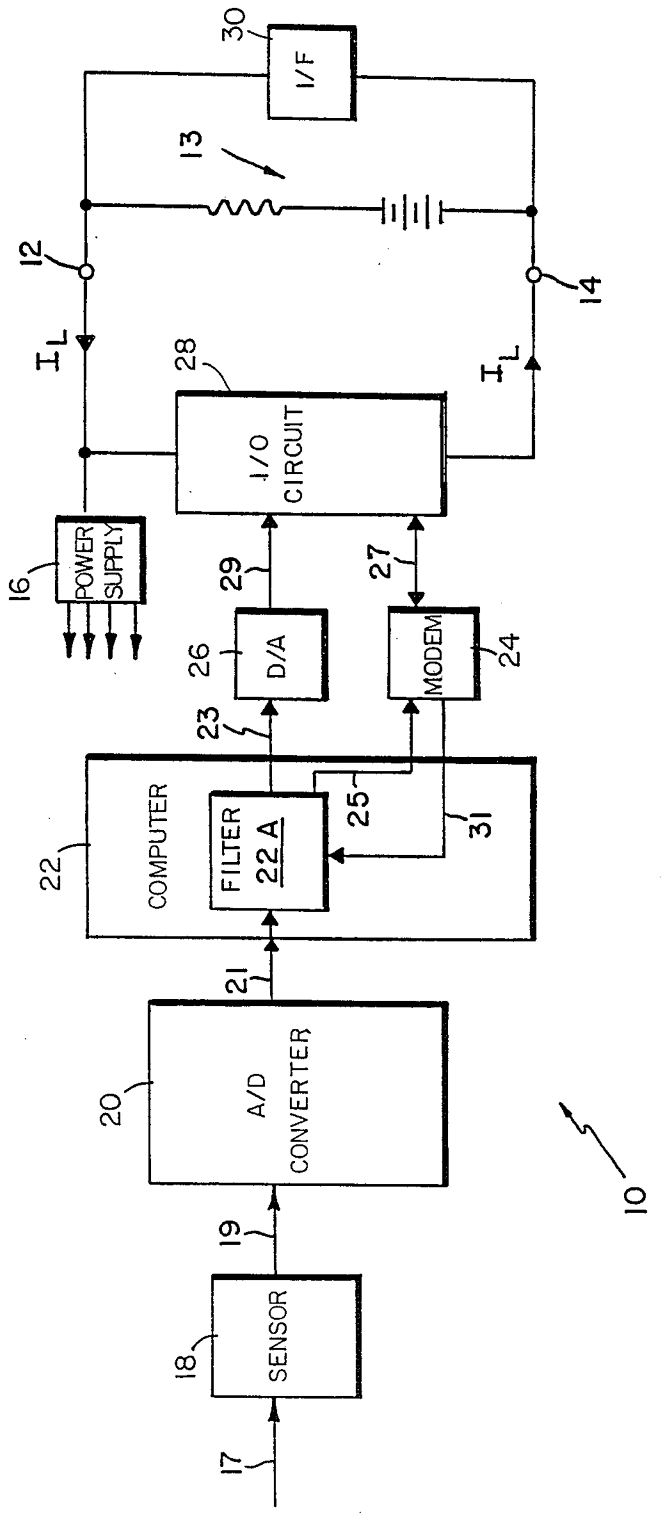
FIG. 1 is an electrical block diagram of a digital transmitter embodying the variable resolution as a function of speed feature of the present invention.

Two-wire transmitter 10 shown in FIG. 1 is a digital transmitter which provides variable resolution as a function of speed in accordance with the present invention. As shown in FIG. 1, transmitter 10 has a pair of terminals 12 and 14 which are connected to a two-wire 4 to 20 milliampere current loop 13 which is typically used in industrial process control systems. Loop current $I_L$ flows into the transmitter through terminal 12 and out of the transmitter through terminal 14. All power for the electrical circuitry of transmitter 10 is derived from the loop current by power supply 16.

As shown in FIG. 1, transmitter 10 includes analog sensor 18, quasi-continuous non-rezeroed integrating A/D converter 20, microcomputer system 22, digital filter 22A, modem 24, digital-to-analog (D/A) converter 26, input-output (I/0) circuit 28, as well as power supply 16. In the embodiment shown in FIG. 1, communication over the two-wire loop 13 connected to terminals 12 and 14 is in the form of an analog signal (by varying the magnitude of analog loop current $I_L$) and a digital signal (which is typically a frequency shift key (FSK) format) on the loop 13. Transmitter 10 can transmit the analog and digital signals to the loop either simultaneously (superimposed) or alternately as desired to interface with a selected control system.

Analog sensor 18 senses the process parameter 17 which, for example, is typically pressure or temperature. Analog sensor 18, which can be a capacitive pressure sensor, provides a sensor output 19 having an analog portion which varies as a function of the sensed parameter 17.

The sensor output 19 is coupled to A/D converter 20 which digitizes the analog portion of sensor output 19 and provides a digitized output 21 representative of parameter 17 to microcomputer system 22. The digital output 21 from A/D converter 20 is digitally filtered by a digital filter 22A in microcomputer system 22 to provide digitally filtered outputs 23 and 25 representing parameter 17. The first digitally filtered output 25 is coupled to modem 24. Modem 24 in turn couples a modulated digital output representative of the sensed parameter 17 along line 27 to I/0 circuit 28. I/0 circuit 28 then varies the current $I_L$ with a serial digital representation of the parameter 17. The modulation can be a low level FSK signal simultaneously superimposed on the analog loop current $I_L$ so the analog current and the FSK signal do not interfere with one another. Alternatively, the modulation can be a higher amplitude baseband serial signal which interrupts transmission of the 4–20 mA analog signal from time to time. The second digitally filtered output 23 is coupled to D/A converter 26. D/A converter 26 converts the digitally filtered output 23 to a digitally filtered analog output 29 representative of the parameter 17. The digitally filtered analog output is coupled to I/0 circuit 28 for controlling the amplitude of the analog 4–20 mA loop current $I_L$.

The present invention is based upon the use of a particular type of A/D converter, together with digital filtering of the digital signal from the A/D converter. With the present invention, the time constant or response time of the digital filter controls the output resolution of the filtered digital outputs 23, 25 generated by microcomputer system 22 for controlling the transmitter's analog and digital outputs.

The present invention is based upon the recognition that, in certain types of A/D converters, the accumulated quantization errors in the output approaches zero as the length of time after an input change increases. The output of such A/D converters thus do not contain inherent quantization errors as the outputs are accumulated or integrated over time. One example of such an A/D converter is found in a now abandoned patent application by Roger L. Frick entitled "MEASUREMENT CIRCUIT", Ser. No. 06/855,178, filed Apr. 23, 1986, which is assigned to the same assignee as the present application. The disclosure of that copending application is incorporated herein by reference. Still another example of an A/D converter of this type is a charge balancing voltage-to-frequency converter described in U.S. Pat. No. 4,623,800 by Timothy Price, which is hereby incorporated by reference.

A/D converters of this type can be configured such that they generate digital outputs having a relatively low resolution at relatively high speeds. These digital outputs are then digitally filtered by digital filter 22A to provide high resolution outputs with a fast update time. The overall response time of the combination of the A/D converter 20 and the digital filter is controlled by adjustment of the response time of the digital filter.

Filters are commonly evaluated by considering the length of time it takes for the output response to reach 63% of a step input change. Using this method of evaluation, the response time of a transmitter according to the present invention may not be substantially different from that of a transmitter which has a substantial dead time and a higher resolution A/D converter but does not have digital filtering to control transmitter resolution and speed. An advantage of the present invention, however, is that the response of a transmitter according to the present invention can be made to appear as an exponential function substantially free of dead time. Dead time will be limited to the sampling rate plus the filtering calculation time of microcomputer system 22 (typically less than 50 milliseconds). Since control systems are much more tolerant of an exponential time constant than dead time, the present invention generally provides better control accuracy and speed of response to disturbances or noise in a given control loop connected to the transmitter.

The present invention has significant advantages over simply varying the integrating time or update time of A/D converter 20. First, changing the integrating time of A/D converter 20 typically involves a hardware change, while the time constant of the digital filter can be reconfigured simply by changing software constants. This can be done by the user through a digital signal sent over the two-wire loop and received by modem 24 and then provided to digital filter 22A along line 31. Thus the user can easily reconfigure the digital filtering time constants via a standard operator interface 30 connected to the two-wire loop and tailor the performance of transmitter 10 to the particular application. This is done simply by adjusting the damping of transmitter 10 to the desired trade-off between speed and "noise". Because the output of transmitter 10 will oscillate about the correct value, the resolution limit will appear as noise rather than as quantization error.

The present invention also lends itself to more complex filtering schemes which can be implemented simply by changing the filtering program used by digital filter 22A. Examples of more complex filtering schemes include adaptive filtering techniques. For example, transmitter 10 can be made to respond quickly with low resolution to large step changes in the parameter, and more slowly with high resolution to small steps. In order to realize the benefits of the present invention, it is important that the proper type of A/D converter is used. Neither successive approximation register (SAR), resistive ladder converters or integrating converters where the stored integrated value is periodically rezeroed are suitable. Rather, the A/D converter 20 used in transmitter 10 is a rapid-sampling, quasi-continuous, integrating A/D converter in which the integral value is not periodically reset to zero. The input to the converter may be sampled at a rate greater than or equal to the update rate and the input offset error voltage of the integrator can be rezeroed periodically as long as the integral value stored in the integrator is not reset. It is also important that the output of A/D converter 20 be updated continuously with substantially no skipped updates. This ensures that sampling or aliasing errors do not limit the high resolution performance of the filtered output.

In one preferred embodiment of the present invention, in which analog sensor 18 is a capacitive pressure sensor and A/D converter 20 is a capacitance-to-digital (C/D) circuit of the type described in the previously mentioned Frick patent application, the digitized output 21 provided to microcomputer system 22 is in the form of a serial digital signal with ten bits of resolution which is provided to microcomputer system 22 every 50 milliseconds. The relatively short update period (50 milliseconds) maintains dead time of transmitter 10 at an insubstantial level. The resolution (10 bits) is not sufficient, however, for all applications.

Rather than selecting a longer update period (which would result in a higher resolution output due to the nature of the particular A/D converter used), microcomputer system 22 performs digital filtering on the updates received every 50 milliseconds. This increases resolution essentially in a relationship which is directly proportional to the time constant of the digital filter. It is much preferable, as described before, in a control loop situation to have an exponential type damping rather than dead time, because dead time leads to instability in a controller coupled to the transmitter output.

Figure 2:
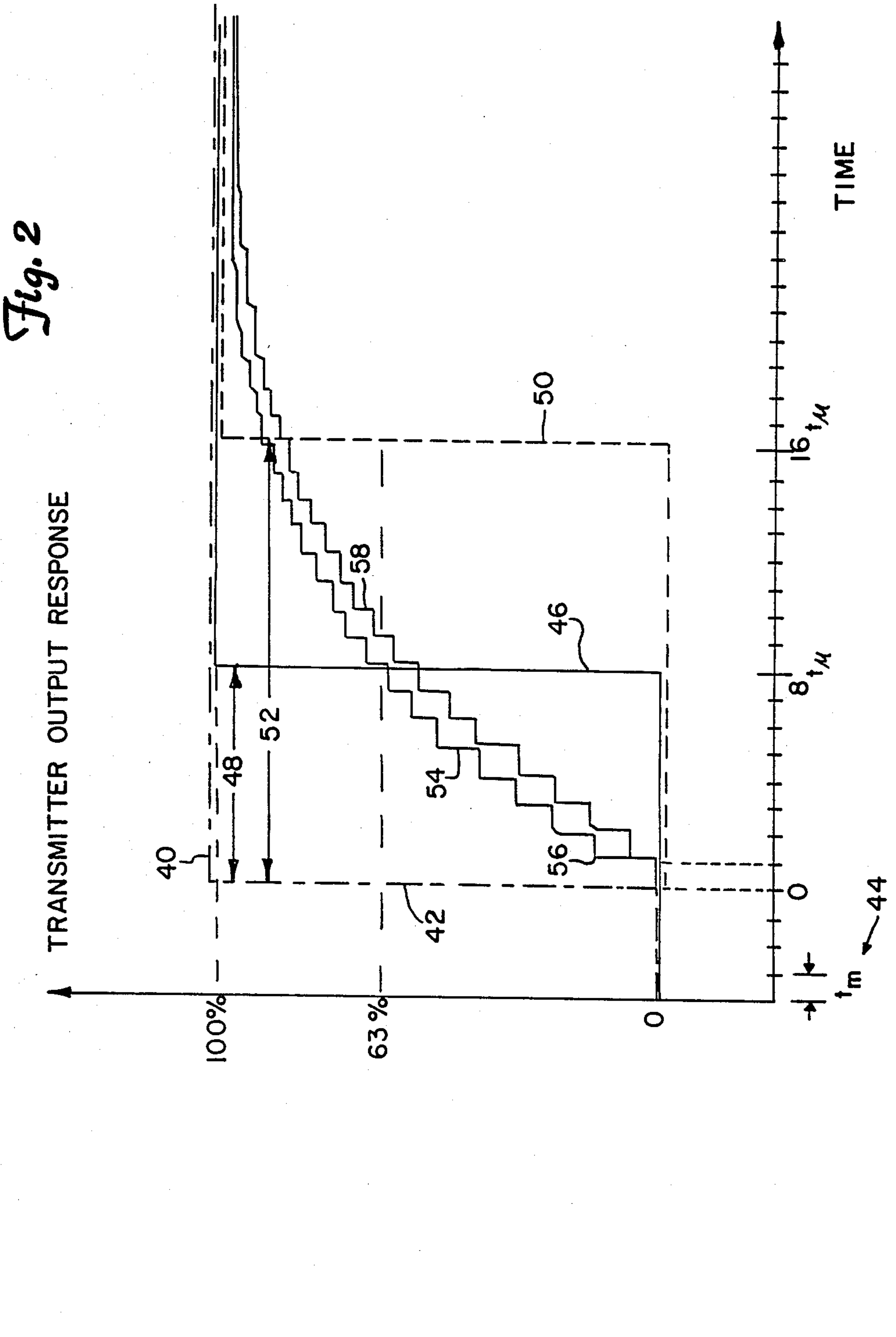
FIG. 2 is a graph showing outputs as functions of time which compares the outputs of an A/D converter with a long count to the outputs of the present invention using one and two stage digital filters.

FIG. 2 is an idealized representation of transmitter output responses to a step input change as a function of time. In FIG. 2, a transmitter input represented by broken line 40 is shown having a step input change 42 from 0 to 100% occurring at time t=0. The transmitter 10 of the present invention has a update time $t_u$ shown for comparison on the time axis at 44. The response of a first transmitter having an A/D converter with an update time of eight time $t_u$ ($8t_u$) is shown at line 46. It can be seen that there is a substantial first dead time 48 associated with the first transmitter's output. The response of a second transmitter having an A/D converter with an update time of $16t_u$ is shown at 50, and the second transmitter has a larger dead time 52 associated with its output. The first and second transmitters are transmitters in which the counting time of the A/D converters is large to achieve high resolution. The response of a transmitter 10 according to the present invention having a digital filter time constant equal to $8t_u$ is shown at 54. It can be seen that this transmitter 10 has already started to respond to the step input change at 56 and there is no substantial dead time associated with the output of transmitter 10. The response of the same transmitter 10 with a two stage digital filter is shown at 58. The filter has a first stage with a $1xt_u$ time constant and a second stage with an $8xt_u$ time constant. Again the transmitter 10 responds quickly to the step input change and there is not substantial dead time.

FIG. 2 also illustrates two different embodiments of the present invention in which the digital filter is a one-stage filter (output shown at 54 in FIG. 2) and in which the digital filter is a two-stage filter with one extra bit (output shown at 58 in FIG. 2). In each case, the output rises exponentially rather than stepwise, as is provided by using a longer count.

With the single stage filter, the resolution in percent is essentially inversely proportional to the time constant of the filter. By using a two-pole or two-stage filter, very high frequency components of the output are filtered out and increased resolution is attained.

Figure 3:
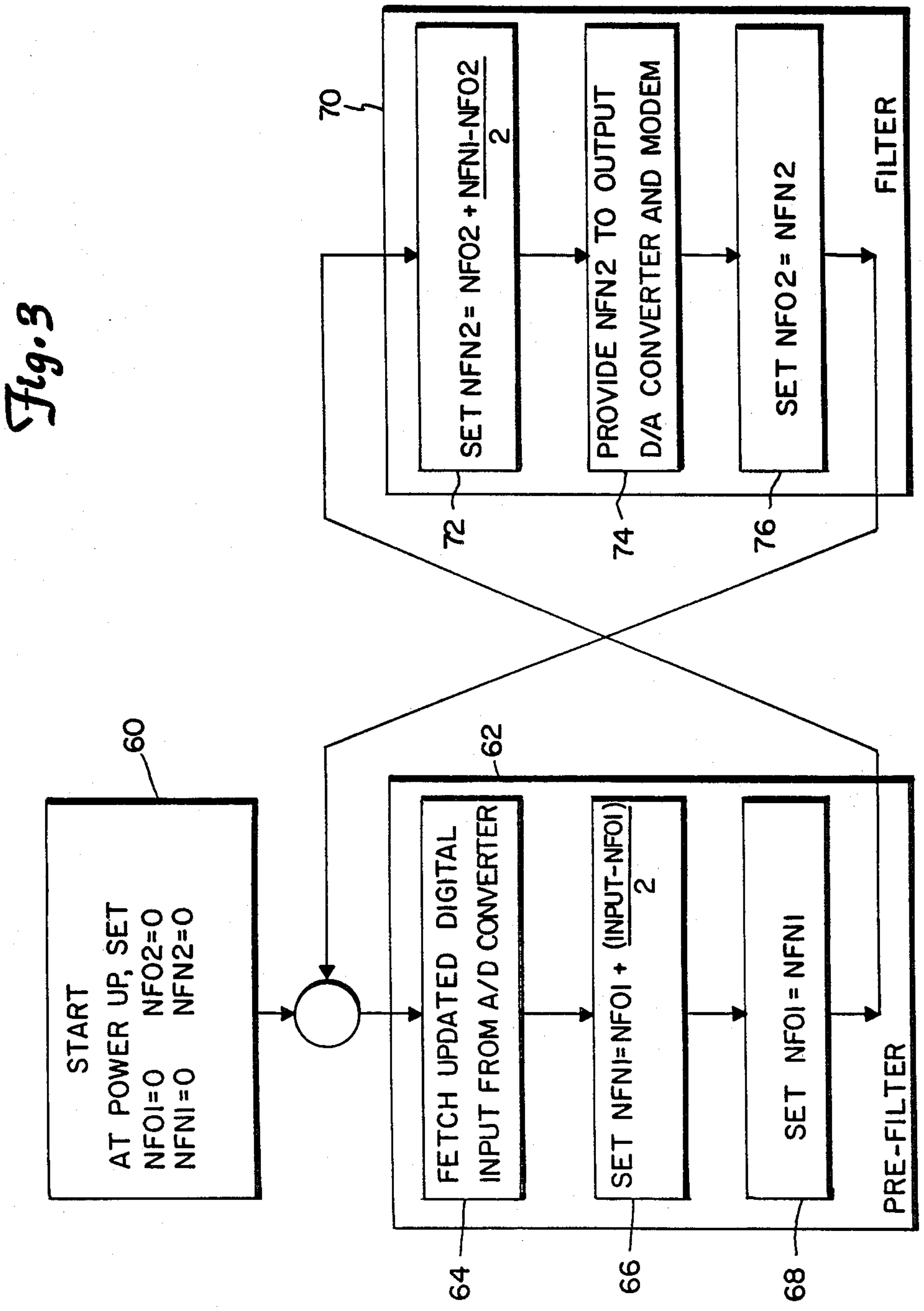
FIG. 3 is a flow chart showing steps performed in digital filtering according to the present invention.

In FIG. 3, a flow chart of a digital filter algorithm for use in filter 22A is shown. At startup of the microprocessor system 22, filter variables are set to zero or some other starting value as shown at 60. A first stage filter, or prefilter 62 processes the digital data. First, a new input is fetched from the A/D converter as shown at 64. Next, a new output value NFN1 for the prefilter is calculated using a selected filter algorithm at shown at 66. Finally, the old output variable NFO1 is set to the value of NFN1 as shown at 68, and the prefilter algorithm provides the value of NFN1 to the second stage filter 70.

In the second stage filter 70 of FIG. 3, a selected filter algorithm is used to filter the data as shown at 72. A numerical value "N" is adjustable and controls the exponential time constant of the filter. "N" can be adjusted, for example, from 0 to 7 to change to filter time constant over a range of 1:256. The newly calculated output value NFN2 is provided to the D/A converter 26 and the modem 24 as shown at 74 in FIG. 3. Next, the old filter variable NFO2 is set to equal the new filter value NFN2. This completes one cycle of the filter within the update time $t_u$. The filter then cycles continuously through the prefilter 62 and the second stage filter 70 to provide continuous updating of the transmitter outputs.

Although one-stage and two-stage filters are illustrated in the example shown in FIGS. 2 and 3, even more complex filtering can be performed if desired. As mentioned earlier, adaptive filtering techniques can be incorporated within the scope of the present invention.

Another advantage of the present invention is that resolution is improved essentially directly with the time constant of the filter which is selected. With some A/D converters which take a random sample of their input and start over (by re-zeroing) on the next conversion cycle, increasing the update time results only in an improvement in resolution which is a square root of the time. With the present invention, the A/D converter 20 does not re-zero and all readings are correlated to each other. As a result, resolution is gained directly as a function of increases in the time constant, rather than as a square root of the increased time constant.

With the present invention, a digital transmitter is provided which offers fast response or high resolution, or a combination of the two, depending on the needs of the user. The user is allowed to make the trade-off between speed or response time and resolution or noise, so that a large number of applications can be handled with a single, adjustable product.

Although the present invention has been described with reference to preferred embodiments, workers skilled in the art will recognize that changes may be made in form and detail without departing from the spirit and scope of the invention.

What is claimed is:

1. A transmitter for providing an output signal as a function of a sensed parameter, the transmitter comprising:

sensing means for providing an analog signal which is a function of the sensed parameter;

integrating analog-to-digital (A/D) converter means for producing a digital signal which is a quasi-continuous, non-rezeroed integrated average of the analog signal;

means for digitally filtering the digital signal to provide a filtered digital signal; and means for providing the output signal as a function of the filtered digital signal.

2. The transmitter of claim 1 wherein the means for digitally filtering performs one-stage digital filtering of the digital signal.

3. The transmitter of claim 1 wherein the means for digitally filtering performs two-stage digital filtering of the digital signal.

4. The transmitter of claim 3 wherein one stage has a fixed time constant equivalent to an A/D converter update time of the integrating A/D converter means and the second stage has an adjustable time constant.

5. The transmitter of claim 1 wherein the means for digitally filtering performs adaptive filtering of the digital signal.

6. The transmitter of claim 1 wherein the means for digitally filtering comprises a digital computer.

7. The transmitter of claim 1 wherein the integrating A/D converter means comprises a charge balancing voltage-to-frequency converter.

8. The transmitter of claim 1 wherein the sensing means comprises a capacitive sensor and wherein the integrating A/D converter means comprises a charge re-balancing capacitance-to-digital converter.

9. The transmitter of claim 1 wherein the means for digitally filtering the signal is adjustable.

* * * * *

UNITED STATES PATENT AND TRADEMARK OFFICE
CERTIFICATE OF CORRECTION

PATENT NO. : 4,866,435

DATED : September 12, 1989

INVENTOR(S) : Roger L. Frick et al.

It is certified that error appears in the above-identified patent and that said Letters Patent is hereby corrected as shown below:

Col. 1, line 54, delete "correction", insert --corrections--.

Col. 4, line 26, "In" at the end of the line should have stared a new paragraph

Col. 5, line 48, delete "at shown", insert --as shown--.

Signed and Sealed this

Fifth Day of May, 1992

*Attest:*

DOUGLAS B. COMER

*Attesting Officer*

*Acting Commissioner of Patents and Trademarks*